US011757924B2

(12) United States Patent
Vlahovic et al.

(10) Patent No.: US 11,757,924 B2
(45) Date of Patent: *Sep. 12, 2023

(54) THIRD-PARTY APPLICATION RISK ASSESSMENT IN AN AUTHORIZATION SERVICE

(71) Applicant: eBay Inc., San Jose, CA (US)

(72) Inventors: Tatjana Vlahovic, San Jose, CA (US); Gail Anna Rahn Frederick, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,744

(22) Filed: Oct. 12, 2022

(65) Prior Publication Data
US 2023/0032191 A1 Feb. 2, 2023

Related U.S. Application Data

(63) Continuation of application No. 16/870,721, filed on May 8, 2020, now Pat. No. 11,503,062.

(51) Int. Cl.
H04L 29/00 (2006.01)
H04L 9/40 (2022.01)
(Continued)

(52) U.S. Cl.
CPC ............ *H04L 63/1433* (2013.01); *G06F 9/54* (2013.01); *G06N 20/00* (2019.01); *G06Q 10/0635* (2013.01); *G06Q 10/10* (2013.01); *G06Q 30/0185* (2013.01); *G06Q 50/265* (2013.01); *H04L 63/0884* (2013.01); *H04L 63/102* (2013.01); *H04L 63/1425* (2013.01); *H04L 63/20* (2013.01)

(58) Field of Classification Search
CPC ............ H04L 63/1433; H04L 63/0884; H04L 63/102; H04L 63/1425; H04L 63/20; G06F 9/54; G06N 20/00; G06Q 10/0635; G06Q 10/10; G06Q 30/0185; G06Q 50/265

See application file for complete search history.

(56) References Cited

U.S. PATENT DOCUMENTS 9,215,231 B1 * 12/2015 Bowen ................ H04L 63/1416
9,485,255 B1 * 11/2016 Avital ................... H04L 63/102
(Continued)

OTHER PUBLICATIONS

Vlahovic, Tanya, "Know Your Developer (KYD)", https://tech.ebayinc.com/engineering/know-your-developer-kyd/, Mar. 9, 2020.

*Primary Examiner* — Don G Zhao
(74) *Attorney, Agent, or Firm* — SHOOK, HARDY & BACON LLP

(57) ABSTRACT

Risk assessment in an authentication service is performed where an authorization request is received from a third-party application. Risk assessment policies for the authorization request are determined based on a class of the third-party application. The risk assessment policies are applied to the authorization request to determine an action to be performed for the authorization request, such as sending an authorization message in response to the authorization request or taking a remedial action (e.g., suspending the application, limiting the available actions, or sending a notification to a trusted security application).

16 Claims, 8 Drawing Sheets

(51) Int. Cl.
  *G06Q 10/0635* (2023.01)
  *G06Q 10/10* (2023.01)
  *G06Q 30/018* (2023.01)
  *G06Q 50/26* (2012.01)
  *G06N 20/00* (2019.01)
  *G06F 9/54* (2006.01)

(56) References Cited

U.S. PATENT DOCUMENTS

| | | | | |
|---|---|---|---|---|
| 10,122,757 | B1* | 11/2018 | Kruse | H04L 63/10 |
| 10,185,507 | B1* | 1/2019 | Olson | G06F 3/0689 |
| 10,268,593 | B1* | 4/2019 | Olson | G06F 3/067 |
| 10,796,295 | B2* | 10/2020 | Subbarayan | H04L 51/02 |
| 10,809,920 | B1* | 10/2020 | Olson | H04L 63/0428 |
| 10,884,810 | B1* | 1/2021 | Verma | H04L 67/02 |
| 10,921,991 | B1* | 2/2021 | Olson | G06F 3/0619 |
| 11,017,379 | B2* | 5/2021 | Williams | G06Q 20/342 |
| 11,093,925 | B2* | 8/2021 | Hayes | G06Q 20/24 |
| 11,178,068 | B1* | 11/2021 | Etler | H04L 47/826 |
| 11,503,062 | B2* | 11/2022 | Vlahovic | G06Q 30/0185 |
| 11,507,283 | B1* | 11/2022 | Olson | G06F 16/909 |
| 2006/0282660 | A1* | 12/2006 | Varghese | G07F 7/1083 |
| | | | | 713/155 |
| 2012/0130853 | A1* | 5/2012 | Petri | G06Q 30/0609 |
| | | | | 705/26.35 |
| 2013/0152047 | A1* | 6/2013 | Moorthi | G06F 11/3688 |
| | | | | 717/124 |
| 2013/0160147 | A1* | 6/2013 | Draluk | G06F 21/51 |
| | | | | 726/30 |
| 2014/0189808 | A1* | 7/2014 | Mahaffey | G06F 21/31 |
| | | | | 726/4 |
| 2015/0350234 | A1 | 12/2015 | Reno et al. | |
| 2016/0048688 | A1* | 2/2016 | Flynn | G06F 21/6281 |
| | | | | 713/193 |
| 2017/0214701 | A1* | 7/2017 | Hasan | H04L 63/1491 |
| 2017/0289134 | A1 | 10/2017 | Bradley et al. | |
| 2018/0027006 | A1* | 1/2018 | Zimmermann | G06F 21/6218 |
| | | | | 726/11 |
| 2019/0261169 | A1* | 8/2019 | Kamal | H04L 63/0815 |
| 2019/0334943 | A1* | 10/2019 | Arvanites | H04W 4/023 |
| 2020/0134601 | A1* | 4/2020 | Ding | G06Q 20/322 |
| 2020/0151721 | A1* | 5/2020 | Sorbello | G06Q 20/322 |
| 2020/0279242 | A1* | 9/2020 | Dahn | G06Q 20/327 |
| 2020/0402001 | A1* | 12/2020 | Kentris | G06Q 30/0222 |
| 2020/0402002 | A1* | 12/2020 | Kentris | G06Q 30/0222 |
| 2021/0250424 | A1* | 8/2021 | Cameron | H04L 67/01 |
| 2021/0272066 | A1* | 9/2021 | Bratman | G06Q 10/0635 |
| 2021/0336983 | A1* | 10/2021 | Lee | H04L 63/0245 |
| 2021/0352097 | A1 | 11/2021 | Vlahovic et al. | |
| 2022/0051181 | A1* | 2/2022 | Yacoub | G06Q 10/06 |
| 2022/0083376 | A1* | 3/2022 | Qureshi | G06F 9/4887 |
| 2023/0032191 | A1* | 2/2023 | Vlahovic | H04L 63/102 |

* cited by examiner

THIRD-PARTY APPLICATION RISK ASSESSMENT IN AN AUTHORIZATION SERVICE

CROSS-REFERENCE TO RELATED APPLICATIONS

This patent application is a continuation of U.S. patent application Ser. No. 16/870,721, filed May 8, 2020, which is herein incorporated by reference in its entirety for all purposes.

BACKGROUND

Currently, eCommerce platforms frequently encounter security and fraud problems involving users and third-party applications that use a service provider's Application Programming Interface (API). One common fraudulent activity is Account Takeover (ATO) where a malicious actor takes over the account of another user, such as a user with a good reputation rating. Once the malicious entity takes over an account, they may access the account user's personal information or electronic wallet, change a shipping address for an item, execute a bid or purchase for an item, submit or post an offer of an item, or ship an item while acting as the account user. For example, the malicious entity may utilize the user's account to bid on an item, purchase the item using the user's wallet, and have the item shipped to an address specified by the malicious actor.

In some instances, third-party applications provided by a particular developer can have a history of security vulnerabilities or misuse, while other developers can have a good history of security, proper usage and performance.

It is with respect to these and other considerations that the disclosure made herein is presented.

SUMMARY

In certain simplified examples of the disclosed technologies, methods, systems, or computer readable media for risk assessment in an authentication service involve risk assessment in an authentication service. In so examples, an authentication service receives an authorization request from a third-party application calling an API and applies one or more risk assessment policies to the authorization request, the risk assessment policies pertaining to behavioral characteristics, to obtain a risk assessment score. If the risk assessment score does not exceed a risk threshold, then the authentication service can send an authorization message in response to the authorization request. But if the risk assessment score exceeds the risk threshold, then the authentication service can execute remedial action for an account, such as blocking a user account or suspending a developer account, associated with the third-party application.

In some examples, a separate trusted security application can be associated with the 3rd party application calling the API and the remedial action can involve calling the trusted security application via a separate channel from the API. In certain examples, one or more of the risk assessment policies are applied to data corresponding to reputation data for the account, reputation data for the third-party application, or a class of use of the third-party application.

Certain examples can also involve collecting behavioral data pertaining to applications associated with the developer account and determining the risk assessment policies by applying machine learning to the collected behavioral data.

Particular examples can involve classifying the third-party application as one of a plurality of classes, were each class has an associated activity profile. In these examples, the functionality for applying the risk assessment policies to the authorization request can involve determining whether activity associated with the third-party application is consistent with the activity profile for the class of the third-party application.

In specific examples, the disclosed technology can reclassify the third-party application based on machine learning applied to the activity associated with the 3d party application.

In yet other examples, the remedial action can include applying a lower rate limit to a number of calls to the API. In certain examples, the remedial action can include suspension of the account, restricting at least one action for the account, sending a notification to an owner of the account, or control usage of the account.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
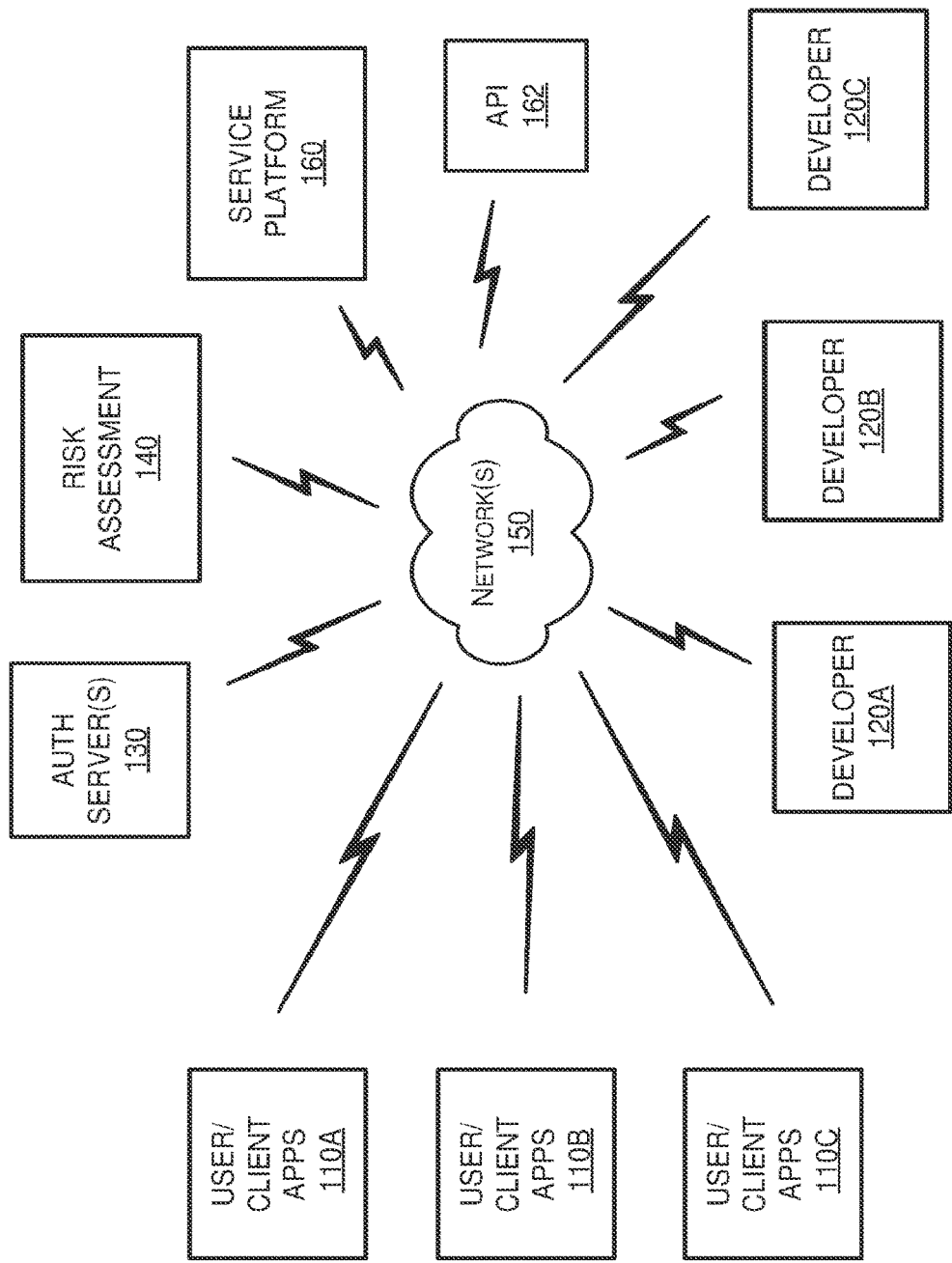
FIG. 1 is an architectural diagram showing an illustrative example of an architecture suitable for application of the disclosed technology for risk assessment in an authentication service.

The following Detailed Description describes technologies for application risk assessment in an authentication service. As noted above, a typical security or fraud problem encountered with third-party applications that utilize a service provider's API is an ATO. Once a malicious entity gains control of an account, they may access and manipulate information and resources accessible through the account.

Solutions are presently provided for protecting user accounts that can block flows or request remedial action from users of a service platform. Generally, the goal of these solutions is to block certain flows if the identity of a user does not match the data maintained by the service platform for the user or redirect those flows to remedial action from the user, e.g. send a message regarding an account access event to a phone number or email address associated with the user. These solutions are relatively straightforward and can be implemented across the user experience for the service platform.

Existing solutions, however, are not typically directed toward protections for third-party developers that utilize public APIs supported by the service platform. These third-party developers can provide expanded utility and value to the service platform by developing their own distinctive user experience and services while leveraging the service platform's APIs.

Currently, identifying a real-world identity of a user who is using a third-party application to access the public APIs provided by the service platform can be challenging. Often, third-party applications integrating with the service platform's APIs do not pass device or end-user information through the API requests, which is often done for Web-based or native applications.

In these circumstances, authorization is typically based on a bearer token, which includes information about a third-party application and a user. Once the bearer token is issued, it can be difficult to identify ATO activities based on the API calls. Applications may then become a back door for malicious entities to act on behalf of ATO'd accounts efficiently.

When a third-party application is used primarily for acting on behalf of ATO'd accounts, e.g. the application acts on behalf of a user of the service platform, it can be relatively simple to apply remedial actions, such as deactivation of the application and suspension of the corresponding developer account. However, the use of most third-party applications is not typically entirely legitimate or primarily malicious. A malicious entity may leverage a third-party website or tool for ATO activities while a website or tool can be used legitimately on behalf of a non-malicious user.

For example, a compromised third-party application can be identified by a risk operations team as having been used by malicious entities to access the service platform. The compromised third-party application may not perform adequate identify verification, risk assessment or user to account mapping or the user may be a legitimate user on the compromised third-party application. The compromised third-party application can still provide value to the service platform, but is nonetheless vulnerable to being leveraged by malicious actors.

However, the information received by the service platform from the compromised third-party application may be limited to data provided by the third-party application on behalf of a service platform user, e.g. the application/user identity pair, which may prevent the service platform from making a more refined determination as to whether the activity from the third-party application is legitimate or malicious.

Without the ability to recognize malicious behavior involving a third-party application, it may become necessary to suspend or block the application or the account associated with the application developer. Because third-party applications can bring many benefits to a service platform, suspension of a developer account associated with an application that has been abused by a malicious entity, but still provides legitimate services to non-malicious entities, can be undesirable.

One technical advantage of the disclosed technology is that it can apply behavior based policies for risk assessment regarding a third-party application that can more effectively discern legitimate activity from malicious or suspicious activity. This can permit mitigation or remediation strategies that do not block all requests from an application, yet dynamically monitor multiple authorizations sent on behalf of different application and user pairs. The result is an authentication schema that can allow some requests from an application to be authenticated while other requests result in remedial action, which allows the application to be maintained in operation while improving security against malicious activity.

Another technical benefit is that the risk assessment policies can be defined for different types of applications. For example, an application classified with a particular class of use or service can have risk assessment policies applied to it that are associated with a normal activity profile for the particular class of use or service. Different applications or classes can have different risk assessment policies.

Still another technical benefit can be that behavioral data can be collected for applications or classes and utilized to create or refine risk assessment policies. Machine learning can be employed in some examples to create or further refine the risk assessment policies for an application or class.

In general terms, the disclosed technology introduces a risk assessment functionality in a service authorization sequence that applies risk assessment policies to a third-party application's use of an API. The risk assessment policies can be based on historical behavioral data, such as a usage pattern of calls to the API during a previous session of calling the API or a history of delegation of permissions by the third-party application.

The risk assessment polices can be applied to an authentication request. For example, the risk assessment polices can be used to determine a risk assessment score. If the risk assessment does not exceed a risk threshold, then an authorization message can be sent in response to the authentication request. If the risk score exceeds the risk threshold, then remedial action can be executed for an account associated with the third-party application, such as an account for a developer of the application.

In some examples, behavioral data can be collected for applications associated with an account. Machine learning can be applied to the collected behavioral data to determine or refine risk assessment policies for the applications associated with the account. The risk assessment polices can be stored and applied to authentication requests from the applications associated with the account.

Further examples can involve classifying a third-party application into a class having an associated activity profile. The risk assessment policies applied to authentication requests from the application to determine whether activity associated with the application is consistent with the activity profile of the class. In certain examples, the third-party application can be reclassified based on machine learning that is applied to the activity associated with the application.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for risk assessment in an authentication service will be described. As will be described in more detail below with respect to the figures, there are a number of applications and services that may embody the functionality and techniques described herein.

FIG. 1 is an architectural diagram showing an illustrative example of an architecture 100 suitable for application of the disclosed technology for risk assessment in an authentication service. In the example of FIG. 1, user/client applications 110A-C can communicate with developers 120A-C, authentication server 130, risk assessment service 140, and service platform 160 and API 162 through network 150.

User/client applications 110A-C can be a Web-based application interfacing with service platform 160 through API 162. Developers 120A-C can be clients or servers associated with developer accounts that are used to create and distribute user/client applications 110A-C. Authentication service 130 is a platform, such as an OAuth based authentication service, for managing authentication and access tokens relating to access of user/client applications 110A-C to service platform 160. Note that authorization service 130, risk assessment service 140 and API 162 can reside in service platform 160.

Figure 2:
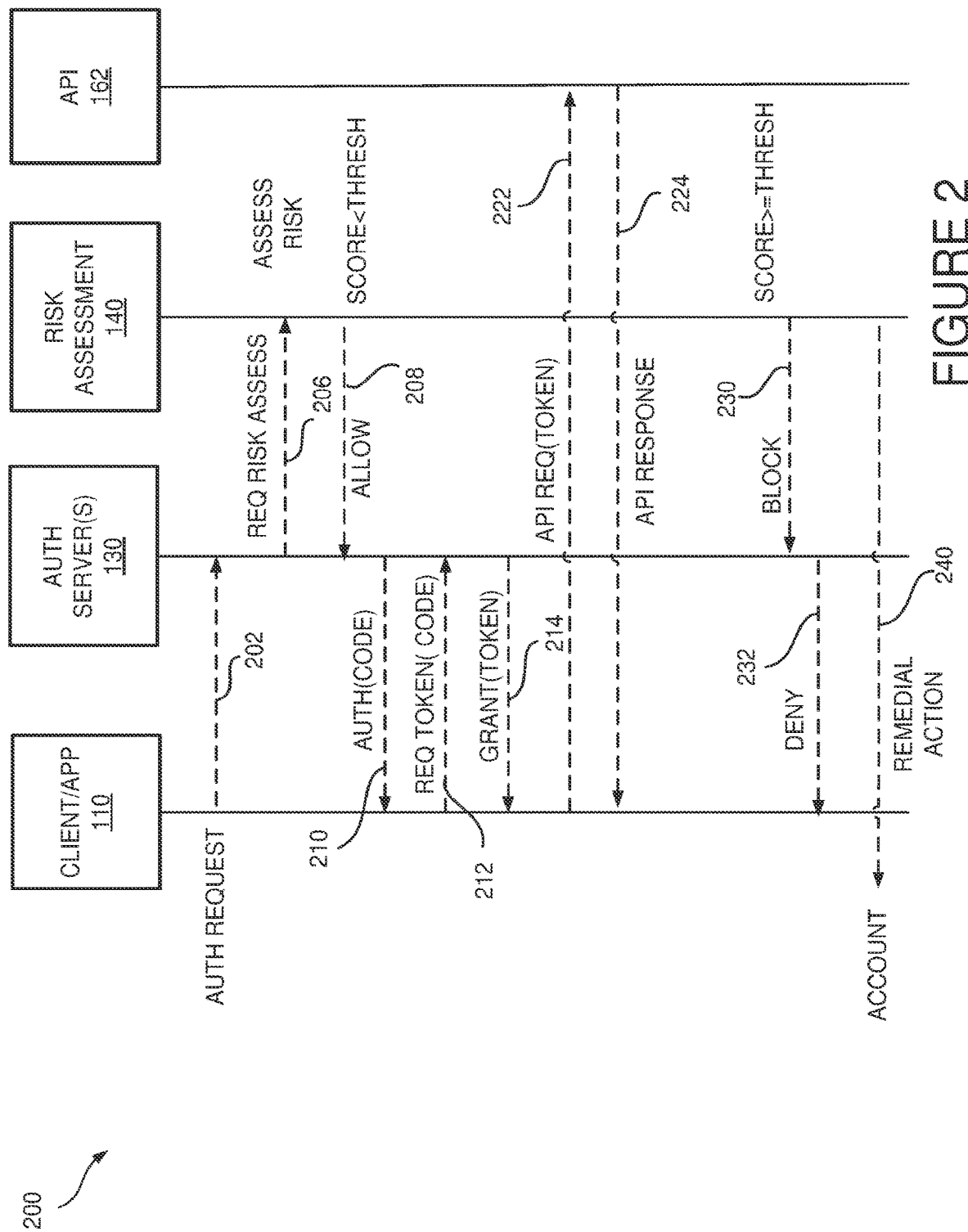
FIG. 2 is a message flow diagram showing a simplified example of an exchange of messages in an application of the disclosed technology for risk assessment in an authentication service.

FIG. 2 is a message flow diagram showing a simplified example of an exchange of messages 200 in an application of the disclosed technology for risk assessment in an authentication service. In this example, a third-party client application 110 initiates an authentication flow with an authorization request, at 202, to authentication service 130 that manages access to a resource, e.g. service platform 160, through API 162.

In this example, at 206, authentication service 130 sends a risk assessment request to risk assessment service 140. Note that authentication service 130 and assessment service 140 may reside on the same platform or different platforms. Risk assessment service 140 determines a risk score associated with the authorization request at 202.

If the risk score is below a risk threshold, then, at 208, risk assessment service 140 returns a message to authentication service 130 indicating that the authorization request from client application 110 is allowed. Authentication service 130 returns, at 210, an authorization message with an authentication code to client application 110.

For example, in accordance with the OAuth 2.0 protocol, the authentication service 130 will validate the request, e.g. by requesting and verifying a user's credentials and validating that the credentials permit access to a protected resource or domain. If validation is successful, then the authentication service 130 will generate an authentication code and send a message to the client application 110 with the authentication code.

Further, in this example in accordance with the OAuth 2.0 authorization protocol, client application 110 can subsequently, at 212, send a token request with the authentication code to authentication service 130, which grants, at 214, an access token to client application 110. Client application 110 can include the access token in a resource access request, at 222, to API 162. In response, at 224, API 162 returns the requested resource.

If the risk score meets or exceeds the risk threshold determined by risk assessment service 140 responsive to the risk assessment request at 206, then, in this example, risk assessment service 140 returns a blocking indication, at 230, to authorization service 130. In response, authentication service 130 sends an authorization denial, at 232, to client application 110. In addition, risk assessment service 140, in this example, takes remedial action, at 240, with respect to an account associated with client application 110, such as an account associated with a third-party developer of client application 110.

Some examples of remedial actions directed toward the account associated with the third-party application can include suspension of the account, restricting at least one action for the account, sending a notification to an owner of the account, or other control of the usage of the account. Additional examples of remedial actions can include applying a lower rate limit to a number of calls to the API and calling a trusted security application associated with the account via a separate channel from the API.

Note that while the disclosed technology is suitable for use with an authentication server 130 as an extension of the OAuth 2.0 authentication protocol, it is to be appreciated that the disclosed technology may be applicable to other authentication processes that utilize a similar authentication protocol capability.

Figure 3:
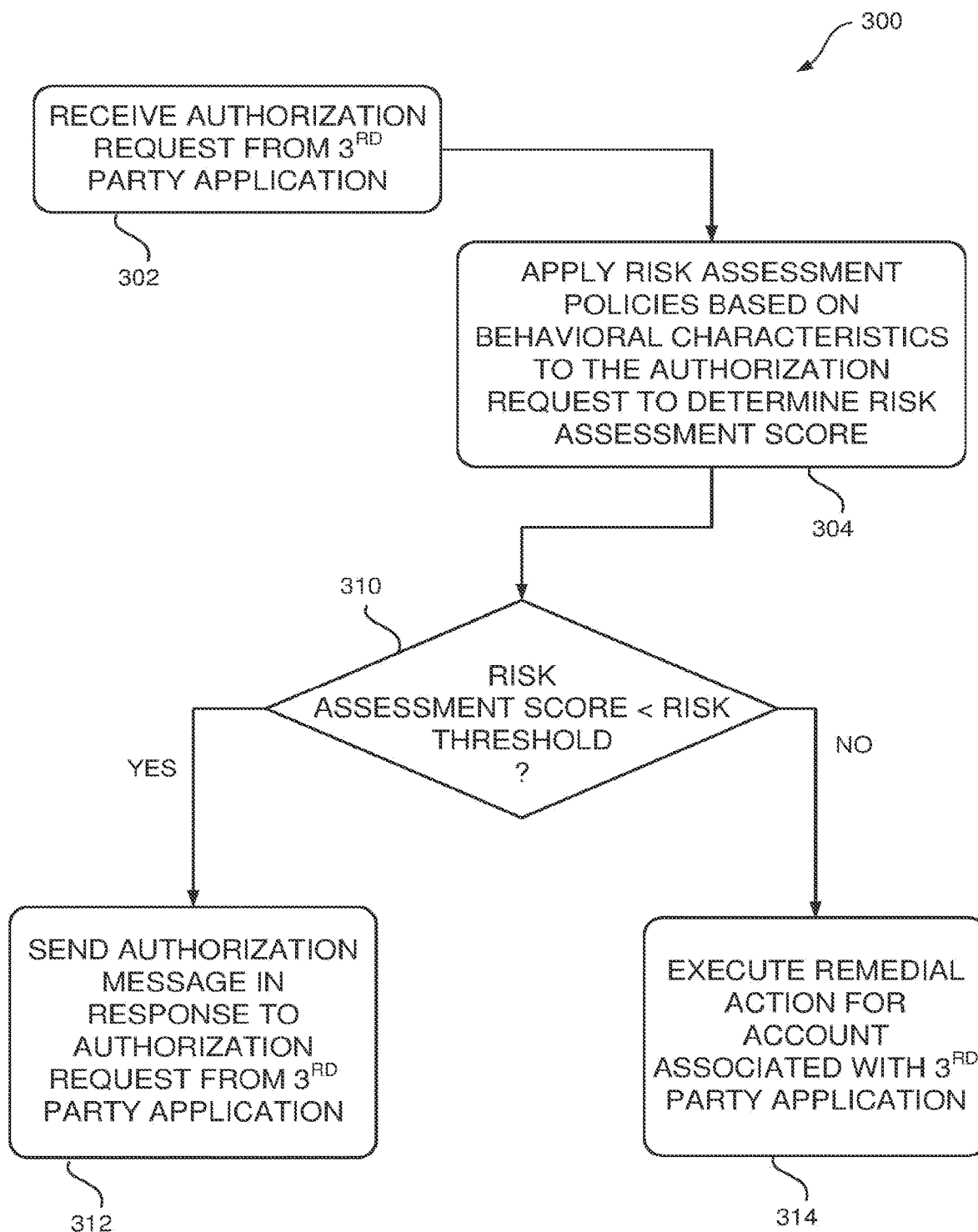
FIG. 3 is a control flow diagram showing an illustrative example of a process for assessing risk for an application in response to an authentication request in accordance with the disclosed technology.

FIG. 3 is a control flow diagram showing an illustrative example of a process 300 for assessing risk for a third-party application in response to an authentication request in accordance with the disclosed technology. At 302, an authorization request is received from a third-party application, such as client application 110. At 304, risk assessment policies based on behavioral characteristics are applied to the authorization request to determine a risk assessment score.

At 310, if the risk assessment score is less than a risk threshold, then an authorization message is sent, at 312, in response to the authorization request from the third-party application and an authentication flow for the third-party application can proceed. The risk threshold can be, for example, a pre-determined value or a dynamic value determined algorithmically, e.g. a leaky bucket type algorithm. If the risk assessment score meets or exceeds the risk threshold, then, at 314, remedial action for an account associated with the third-party application can be executed.

For example, remedial action may involve blocking the authorization request for the user requesting access using the third-party application. In other examples, the remedial action can involve deactivation or suspension of the third-party application for all users of a platform due to the frequency of ATO activity involving the application. In still other examples, the account associated with the third-party application is a developer account and the remedial action can be applied to some or all third-party applications associated with the developer account.

Note that in certain examples, the risk assessment policies can be applied in response to a request for an access token. For example, in the example of FIG. 2, the risk assessment can be performed in response to the token request at 212.

Further note that, in various examples, the risk assessment policies can be based on past behavior of a third-party application, a user of the third-party application, a developer of the third-party application, or a combination of some of these and other factors. The risk assessment policies, in some examples, can make a more refined risk determination based on a complex set of behavior data spanning user, application and developer behavior. The risk assessment score can be based on a sum or scores from multiple policies, weighted policies, or knock-out policies (e.g. an absolute rejection policy).

In some examples, the policies can be a defined set of rules that assess one or more of collected identity information, client device data, velocity checks (e.g. a number of sign-in attempts), user reputation on an API platform, historical user activity patterns, existing user authorizations given to third-party applications, an API usage pattern for a third-party application, a classification of a third-party application, value of a third-party application to an API platform, historical ATO activity involving a third-party application.

For example, device fingerprinting and other client relevant behavioral data coming from a client or user who is attempting to login to an eCommerce platform can be captured. If a mismatch is detected between characteristics of the login attempt and behavior based risk assessment policies, e.g. the login attempt is being made from a different device, geolocation, or application than historically observed, then a risk decision can be made to prevent authorization of harmful access, e.g. identify an account takeover attempt.

In another example, a user who utilizes a third-party application to list and sell items through an eCommerce platform would establish a pattern of behavior with respect to one or more APIs for the platform. If the seller user authorizes another party to manage logistics for their sales, then the other party may begin accessing a logistics API on behalf of the seller user. The approach of the disclosed technology can detect the change in behavior and execute a remedial action that sends a message to the seller user requesting confirmation that the other party is authorized to access the API.

Similarly, if the seller user historically did not call the logistics API for the platform, the disclosed technology can detect the change in behavior and take remedial action to block access to the logistics API until the seller user confirms their identity.

In addition, artificial intelligence and machine learning techniques can be utilized to generate risk assessment polices. In certain examples, different types or classes of third-party applications can have different policies. These policies can be based on classification and clustering of third-party applications or regression machine learning. In some examples, machine learning can be utilized to predict optimal policies for a third-party application or class of applications. In yet other examples, machine learning can be used to re-classify a third-party application based on ongoing collection of behavioral data.

The remedial action can take a variety of forms in different examples. For instance, a notification can be sent to an owner of the account associated with the third-party application, such as a notification to an address associated with the account so that a developer of the application can take action. For example, a high risk access attempt can result in a notification to a user or a developer of the third-party application involved in the attempt. In other examples, all third-party applications associated with the account can be blocked from authorization or restricted to limited access to an API. For example, the user account or application can be suspended, limited to certain actions, or otherwise controlled. In additional examples, a user account can be suspended, restricted, limited to certain actions or otherwise controlled to limit harm to the account.

In another example of remedial action, a developer can have its reputation revised based on risk assessments or can receive notifications regarding user or application behavior. In still another example, the remedial action can be a call to a trusted security application that is associated with the third-party application or developer. The call to the trusted security application can involve a channel other than the API called by a third-party application. In further examples, positive behavior can be recognized through the risk assessment policies that result in enhanced service, such as higher performance, being provided to a user or developer.

Figure 4A:
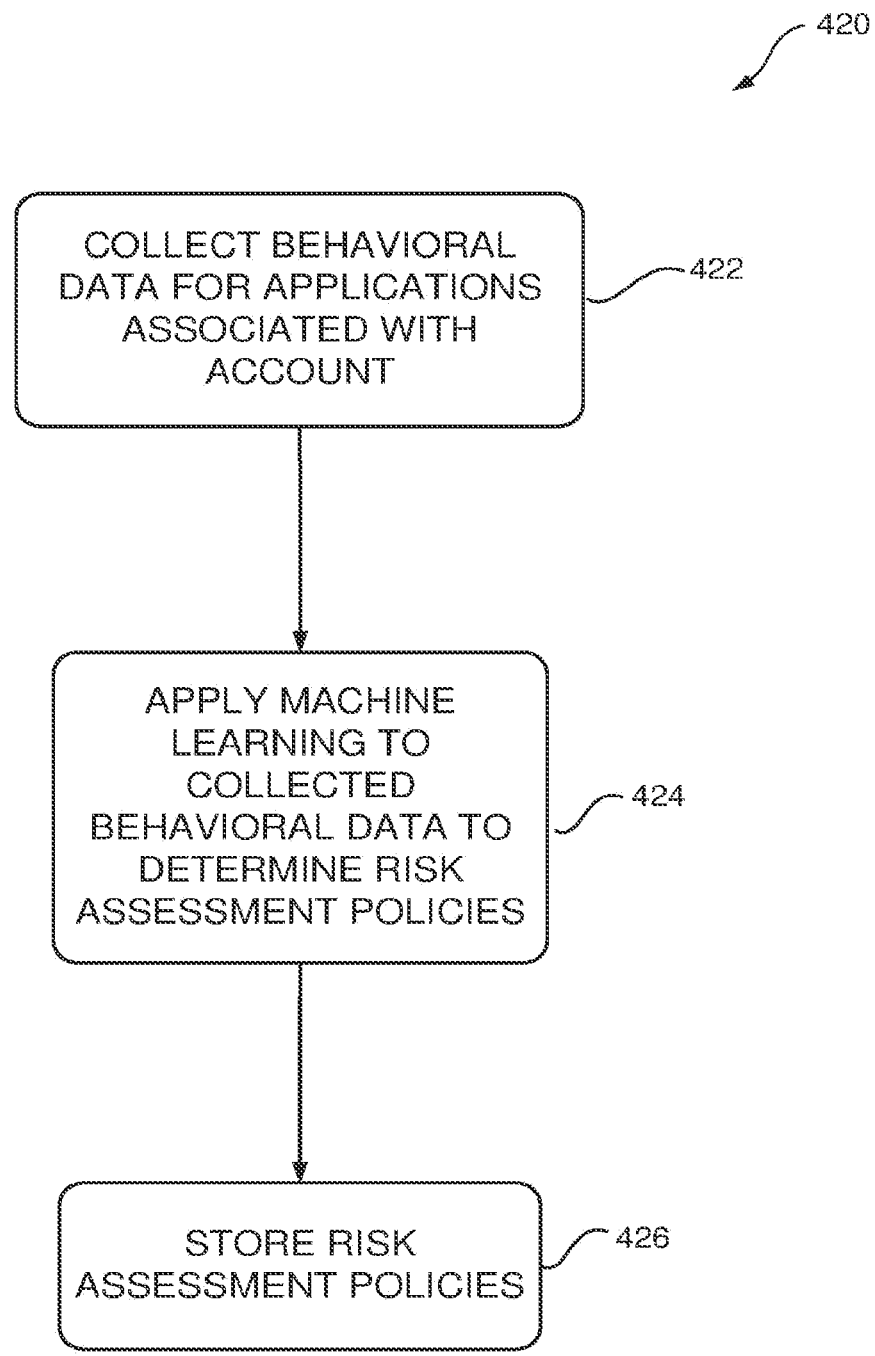
FIG. 4A is a control flow diagram showing an illustrative example of a process for applying machine learning to behavioral data collected for applications to determine risk assessment policies in accordance with the disclosed technology.

FIG. 4A is a control flow diagram showing an illustrative example of a process 420 for applying machine learning to behavioral data collected for applications to determine risk assessment policies in accordance with certain aspects of the disclosed technology. A process such as process 420 may be performed by the combination of authentication service 130 and risk assessment service 140.

In this example, at 422, behavioral data is collected for one or more third-party applications associated with an account, e.g. a developer's account. Other examples of behavioral data that can be collected on a platform and utilized for risk assessment may include data for successful and failed consents or the permissions that platform users gave to third-party applications. In another example, API usage data can be collected and analyzed to identify usage patterns.

At 424, machine learning techniques can be applied to the collected behavioral data to determine risk assessment policies. For example, machine learning may identify a behavior pattern for a class of third-party applications relating to payment or a class relating to shipment and risk assessment policies generated based on the behavior pattern. In another example, machine learning may identify a correlation of successful and failed consents and permissions across platform users for a third-party application.

At 426, the risk assessment policies are stored for application to authorization requests with respect to an API for a resource.

Figure 4B:
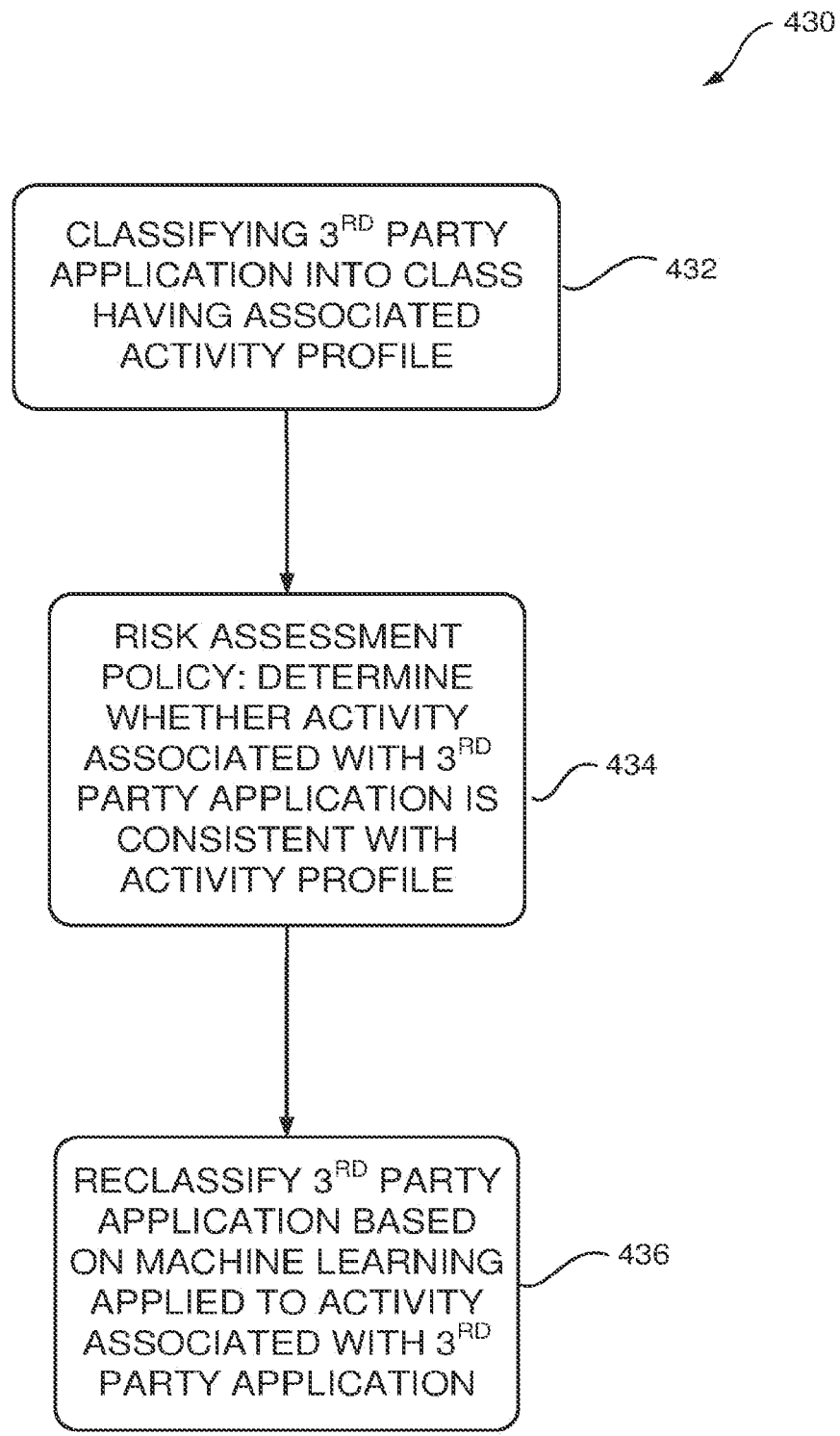
FIG. 4B is a control flow diagram showing an illustrative example of a process for assessing application risk based on an activity profile associated with a classification of the application in accordance with the disclosed technology.

FIG. 4B is a control flow diagram showing an illustrative example of a process 430 for assessing application risk based on an activity profile associated with a classification of the application in accordance with the disclosed technology. A process such as process 430 may be performed in risk assessment service 140.

At 432, a third-party is classified into a class having an associated activity profile. The classification can, in some examples, be determined by input actions received from an administrator or from classification data provided to a risk assessment service from other risk assessment services. In other examples, machine learning can be applied to historical behavioral data for a third-party application, user or developer to identify an initial classification for the third-party application. For example, through these approaches, a third-party application can be initially classified as a messaging application, a financial application, or a logistics application.

At 434, risk assessment policies are applied to an authorization request from the client application 110 to determine whether the activity associated with the third-party application is consistent with the activity profile associated with the classification of the third-party application. For example, at 304 in FIG. 3, risk assessment policies defined for the activity profile associated with the classification of the third-party application can be applied to an authorization request from the third-party application in client application.

At 436, machine learning can be applied to the activity associated with the third-party application, e.g. historical behavioral data collected for the third-party application, to reclassify the third-party application. For example, an initial classification for a third-party application can be refined based on observed activity to a different classification with a different associated activity profile. Also, in another example, if usage of a third-party application changes over time, then machine learning may reclassify the third-party application to a classification more consistent with more recent activity.

Note that, in some examples, risk intelligence can be shared across multiple authentication services, such that risk assessment policies developed for risk assessment in one authentication service can be shared with other authentication services on the same or other platforms. In addition, risk assessment policies can be received from the other authentication services.

It should be appreciated that a variety of different approaches can be taken to assessing risk for a third-party application in response to an authentication request without departing from the teachings of the disclosed technology. For example, a variety of different risk assessment policies, behavioral data, and remedial actions from those described in the examples above can be utilized in accordance with the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to trust delegation. The specific examples of different aspects of trust delegation described herein are illustrative and are not intended to limit the scope of the techniques shown.

Computer Architectures for Trust Delegation

Figure 6:
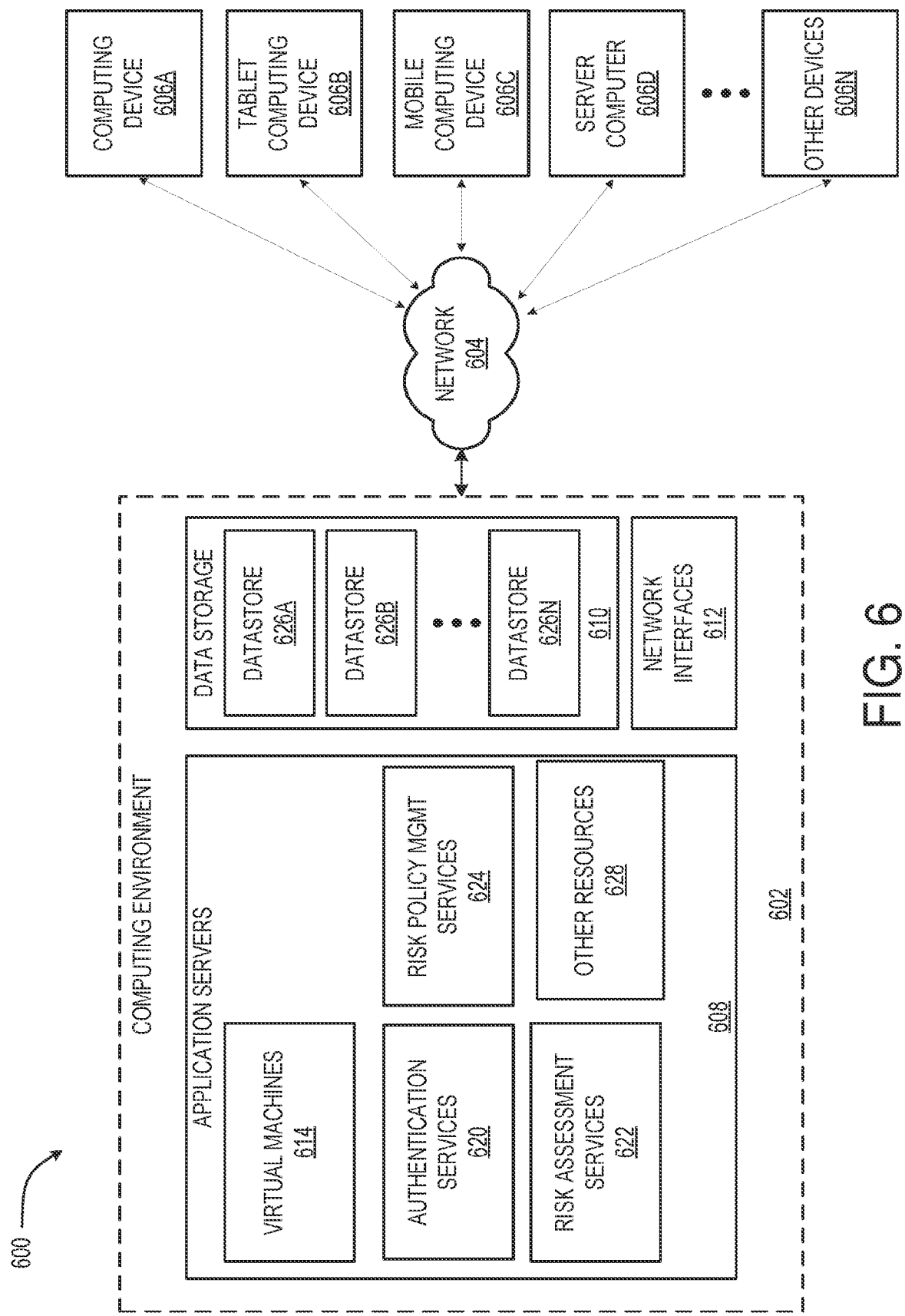
FIG. 6 is a diagram illustrating a distributed computing environment capable of implementing aspects of the techniques and technologies presented herein.

Note that at least parts of processes 300, 420 and 430 of FIGS. 3, 4A and 4B and other processes and operations pertaining to trust delegation described herein may be implemented in one or more servers, such as computer environment 600 in FIG. 6, or the cloud, and data defining the results of user control input signals translated or interpreted as discussed herein may be communicated to a user device for display. Alternatively, the authentication service processes may be implemented in a server or in a cloud service. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 300, 420 and 430 of FIGS. 3, 4A and 4B) are described herein as being implemented, at least in part, by an application, component, and/or circuit. Although the following illustration refers to the components of FIGS. 3, 4A and 4B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 300, 420 and 430 of FIGS. 3, 4A and 4B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
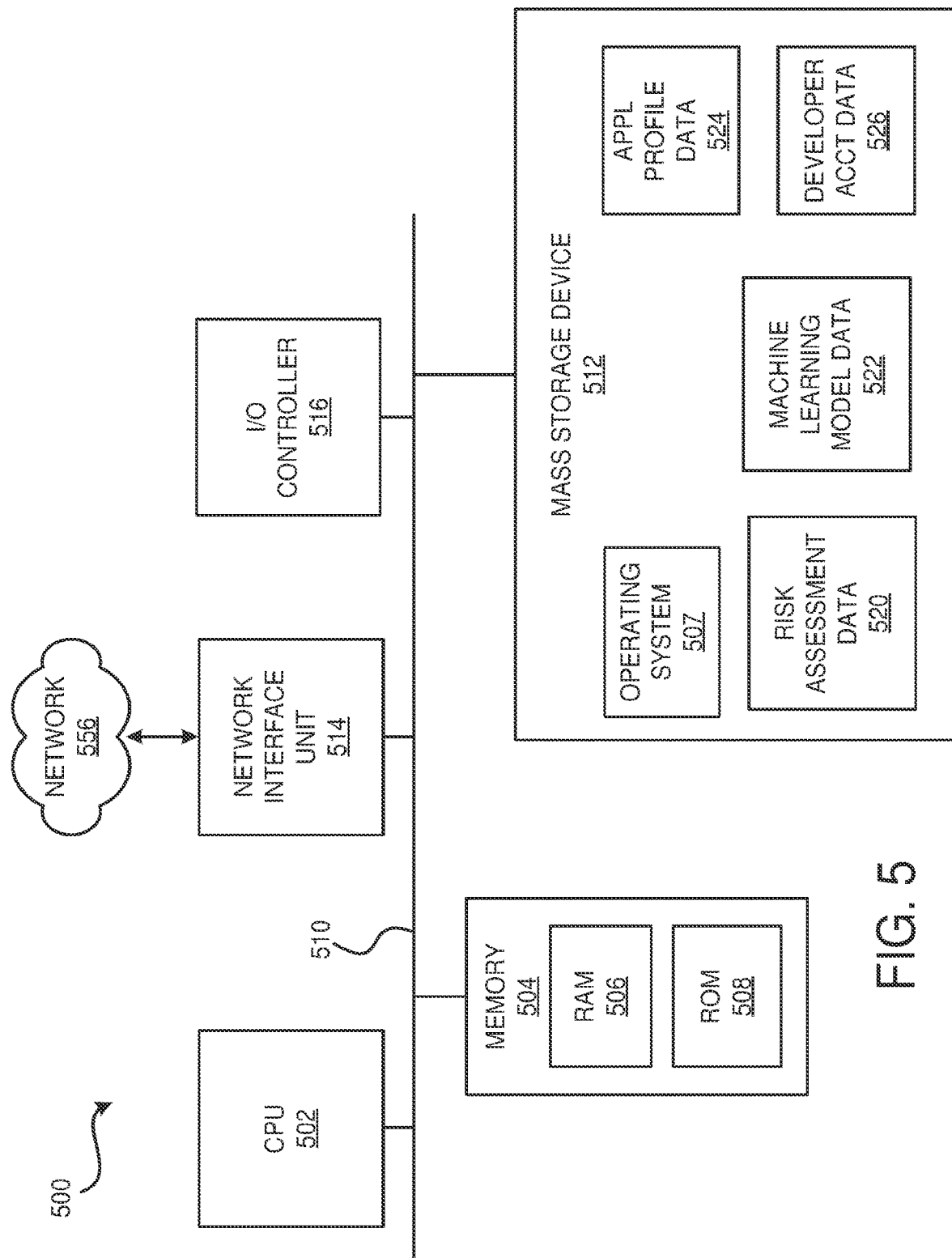
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110A-C, 120A-C, 130, 140 and 160 in FIG. 1, capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as key and access token data 520 where access tokens are stored in association with keys), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for trust delegation. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for trust delegation. It should be understood that this configuration is illustrative only and should not be construed as being limiting in any way.

According to various implementations, the application servers 608 also include one or more of authentication services 620, risk assessment services 622, and risk policy management services 624. The authentication services 620 can include services for handling authentication requests, verifying user credentials, and issuing authentication codes and access tokens. The risk assessment services 622 can include services for applying risk assessment polices to an authentication request. The risk policy management services 624 can include services for defining risk assessment policy rules and applying machine learning to collected behavioral data to generate or refine risk assessment policy rules.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for a trust delegation. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for trust delegation, among other aspects.

Figure 7:
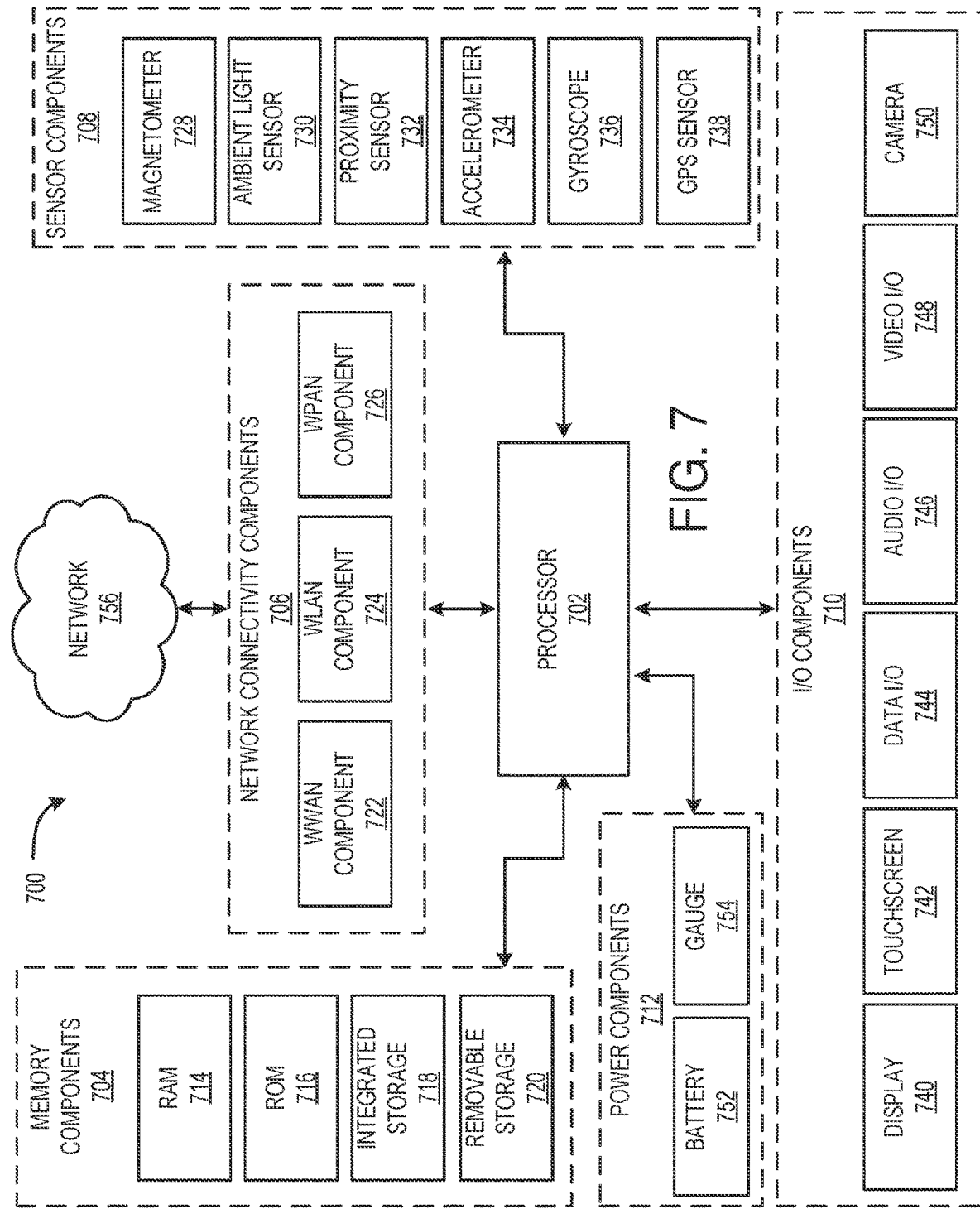
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for trust delegation. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110, resource servers 120A-C and authentication server 130 shown in FIG. 1 and computing devices 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented risk assessment method in an authentication service, the method comprising: receiving an authorization request from a third-party application calling an Application Programming Interface (API), applying one or more risk assessment policies to the authorization request, the risk assessment policies pertaining to behavioral characteristics, to obtain a risk assessment score, if the risk assessment score does not exceed the risk threshold, then sending an authorization message in response to the authorization request, and if the risk assessment score exceeds a risk threshold, then executing remedial action for an account associated with the third-party application.

Clause 2. The risk assessment method of Clause 1, where the behavioral characteristics include at least one of: a usage pattern of calls to the API during a previous session of calling the API, and a history of delegation of permissions by the third-party application.

Clause 3. The risk assessment method of Clause 1, wherein: a separate trusted security application is associated with the 3rd party application calling the API, and the remedial action comprises calling the trusted security application via a separate channel from the API.

Clause 4. The risk assessment method of Clause 1, where one or more of the risk assessment policies are applied to data corresponding to reputation data for the account, reputation data for the third-party application, and a class of use of the third-party application.

Clause 5. The risk assessment method of Clause 1, where the account associated with the third-party application comprises a developer account and the method includes: collecting behavioral data pertaining to applications associated with the developer account; and determining the risk assessment policies by applying machine learning to the collected behavioral data.

Clause 6. The risk assessment method of Clause 1, where the method includes: classifying the third-party application as one of a plurality of classes, each class having an associated activity profile, and the step of applying one or more risk assessment policies to the authorization request includes determining whether activity associated with the third-party application is consistent with the activity profile for the class of the third-party application Clause 7. The risk assessment method of Clause 6, the method including: reclassifying the 3d party application based on machine learning applied to the activity associated with the 3d party application Clause 8. The risk assessment method of Clause 1, where the remedial action comprises applying a lower rate limit to a number of calls to the Application Programming Interface.

Clause 9. The risk assessment method of Clause 1, where the remedial action comprises at least one of suspension of the account, restricting at least one action for the account, sending a notification to an owner of the account, or control usage of the account.

Clause 10. A system for risk assessment in an authentication service, the system comprising: one or more processors; and one or more memory devices in communication with the one or more processors, the memory devices having computer-readable instructions stored thereupon that, when executed by the processors, cause the processors to perform a method for risk assessment in an authentication service, the method comprising: receiving an authorization request from a third-party application calling an Application Programming Interface (API); applying one or more risk assessment policies to the authorization request, the risk assessment policies pertaining to behavioral characteristics, to obtain a risk assessment score; if the risk assessment score does not exceed the risk threshold, then sending an authorization message in response to the authorization request; and if the risk assessment score exceeds a risk threshold, then executing remedial action for an account associated with the third-party application.

Clause 11. The risk assessment system of Clause 10, where the behavioral characteristics include at least one of: a usage pattern of calls to the API during a previous session of calling the API; and a history of delegation of permissions by the third-party application.

Clause 12. The risk assessment system of Clause 10, wherein: a separate trusted security application is associated with the 3rd party application calling the API; and the remedial action comprises calling the trusted security application via a separate channel from the API.

Clause 13. The risk assessment system of Clause 10, where one or more of the risk assessment policies are applied to data corresponding to reputation data for the account, reputation data for the third-party application, and a class of use of the third-party application.

Clause 14. The risk assessment system of Clause 10, where the account associated with the third-party application comprises a developer account and the method includes: collecting behavioral data pertaining to applications associated with the developer account; and determining the risk assessment policies by applying machine learning to the collected behavioral data.

Clause 15. The risk assessment system of Clause 10, where the method includes: classifying the third-party application as one of a plurality of classes, each class having an associated activity profile; and the step of applying one or more risk assessment policies to the authorization request includes determining whether activity associated with the third-party application is consistent with the activity profile for the class of the third-party application.

Clause 16. The risk assessment system of Clause 15, the method including: reclassifying the 3d party application based on machine learning applied to the activity associated with the 3d party application.

Clause 17. The risk assessment system of Clause 10, where the remedial action comprises applying a lower rate limit to a number of calls to the Application Programming Interface.

Clause 18. The risk assessment system of Clause 10, where the remedial action comprises at least one of suspension of the account, restricting at least one action for the account, sending a notification to an owner of the account, or control usage of the account.

Clause 19. One or more computer storage media having computer executable instructions stored thereon which, when executed by one or more processors, cause the processors to execute a risk assessment method in an authentication service, the method comprising: receiving an authorization request from a third-party application calling an Application Programming Interface (API); applying one or more risk assessment policies to the authorization request, the risk assessment policies pertaining to behavioral characteristics, to obtain a risk assessment score; if the risk assessment score does not exceed a risk threshold, then sending an authorization message in response to the authorization request; and if the risk assessment score exceeds then risk threshold, then executing remedial action for an account associated with the third-party application.

Clause 20. The computer storage media of Clause 19, where: the behavioral characteristics include at least one of: a usage pattern of calls to the API during a previous session of calling the API, and a history of delegation of permissions by the third-party application; and the remedial action includes at least one of: applying a lower rate limit to a number of calls to the API, calling a trusted security application via a separate channel from the API, suspension of the account, restricting at least one action for the account, sending a notification to an owner of the account, and control usage of the account.

What is claimed is:

1. A computer-implemented method comprising:
receiving an authorization request from a third-party application calling an Application Programming Interface (API);
determining one or more risk assessment policies for the authorization request based on a class of the third-party application;
applying the one or more risk assessment policies to the authorization request to obtain a risk assessment score for the authorization request;
performing a comparison of the risk assessment score to a risk threshold; and
causing a remedial action to be performed based on the comparison, wherein the remedial action comprises calling a trusted security application via a separate channel from the API.

2. The computer-implemented method of claim 1, wherein performing the comparison of the risk assessment score to the risk threshold comprises detecting that the risk assessment score exceeds the risk threshold.

3. The computer-implemented method of claim 1, wherein the class of the third-party application is associated with an activity profile, and wherein applying the one or more risk assessment policies to the authorization request to obtain the risk assessment score for the authorization request comprises determining whether activity associated with the authorization request is consistent with the activity profile for the class of the third-party application.

4. The computer-implemented method of claim 1, wherein the one or more risk assessment policies are identified by applying machine learning to behavioral data collected for a plurality of other third-party applications associated with the class of the third-party application.

5. The computer-implemented method of claim 1, wherein the method further comprises:
classifying the third-party application as the class of the third-party application based on behavioral data collected for the third-party application.

6. The computer-implemented method of claim 5, wherein the method further comprises:
reclassifying the third-party application as a second class based on additional behavioral data collected for the third-party application.

7. One or more computer storage media storing computer-useable instructions that, when executed by a computing device, cause the computing device to perform operations, the operations comprising:
receiving an authorization request from a third-party application;
classifying the third-party application as a first class from a plurality of classes based on behavioral data collected for the third-party application;
identifying one or more risk assessment policies based on the first class of the third-party application;
determining an action by applying the one or more risk assessment policies to the authorization request;
causing the action to be performed in response to the authorization request; and
reclassifying the third-party application as a second class based on additional behavioral data collected for the third-party application.

8. The computer storage media of claim 7, wherein the operations further comprise:
collecting behavioral data for a plurality of third-party applications associated with the first class; and
generating at least a portion of the one or more risk assessment policies based on the collected behavioral data.

9. The computer storage media of claim 7, wherein the first class is associated with an activity profile, and wherein determining the action by applying the one or more risk assessment policies to the authorization request comprises comparing activity associated with the third-party application with the activity profile for the first class.

10. The computer storage media of claim 7, wherein determining the action by applying the one or more risk assessment policies to the authorization request comprises determining a risk assessment score using the one or more risk assessment policies, and comparing the risk assessment score to a risk threshold.

11. The computer storage media of claim 10, wherein comparing the risk assessment score to the risk threshold comprises detecting that the risk assessment score does not exceed the risk threshold, and wherein the action comprises sending an authorization message in response to the authorization request.

12. The computer storage media of claim 10, wherein comparing the risk assessment score to the risk threshold comprises detecting that the risk assessment score exceeds the risk threshold, and wherein the action comprises executing a remedial action.

13. A computer system comprising:
a hardware processor; and
a computer storage medium storing computer-useable instructions that, when executed by the processor, causes the computer system to perform operations comprising:
receiving an authorization request from a third-party application;
determining one or more risk assessment policies for the authorization request based on a class of the third-party application;
determining a remedial action for the authorization request using the one or more risk assessment policies; and
causing the remedial action to be performed as a response to the authorization request, wherein the remedial action comprises calling a trusted security application via a separate channel from the API.

14. The computer system of claim 13, wherein the operations further comprise:
determining the class of the third-party application based on behavioral data for the third-party application and behavioral data for a plurality of third-party applications associated with the class.

15. The computer system of claim 13, wherein determining the action for the authorization request using the one or more risk assessment policies comprises:

determining a risk assessment score using the one or more risk assessment policies; and comparing the risk assessment score to a threshold.

16. The computer system of claim 13, wherein the action comprises sending an authorization message in response to the authorization request.

\* \* \* \* \*